US009681086B2

(12) United States Patent
Greene et al.

(10) Patent No.: US 9,681,086 B2
(45) Date of Patent: Jun. 13, 2017

(54) SYSTEM AND METHOD FOR CONTINUING PLAYBACK IN WIDGET AFTER APP IS BACKGROUNDED

(71) Applicant: Google Inc., Mountain View, CA (US)

(72) Inventors: Kevin Greene, San Francisco, CA (US); Tim Johnson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 115 days.

(21) Appl. No.: 14/206,838

(22) Filed: Mar. 12, 2014

(65) Prior Publication Data

US 2015/0264292 A1 Sep. 17, 2015

(51) Int. Cl.
| H04N 9/80 | (2006.01) |
| H04N 5/76 | (2006.01) |
| G06F 9/445 | (2006.01) |
| H04N 21/472 | (2011.01) |

(52) U.S. Cl.
CPC ............... *H04N 5/76* (2013.01); *G06F 9/445* (2013.01); *H04N 21/472* (2013.01)

(58) Field of Classification Search
CPC .................................. H04N 5/76; G06F 9/445
USPC ......................................................... 386/248
See application file for complete search history.

(56) References Cited

U.S. PATENT DOCUMENTS

| 2010/0066698 | A1* | 3/2010 | Seo ................................ 345/173 |
| 2010/0204914 | A1* | 8/2010 | Gad ........................ G01C 21/36 701/533 |
| 2012/0185803 | A1* | 7/2012 | Wang .................. G06F 3/04817 715/847 |
| 2012/0260118 | A1* | 10/2012 | Jiang et al. .................... 713/340 |
| 2013/0014171 | A1* | 1/2013 | Sansom et al. .................. 725/52 |
| 2013/0302008 | A1* | 11/2013 | Kwon et al. .................. 386/230 |
| 2015/0206269 | A1* | 7/2015 | Qin et al. ...................... 386/248 |

FOREIGN PATENT DOCUMENTS

| JP | 2013544450 | 12/2013 |
| KR | 10-20110059140 | 6/2011 |
| KR | 10-20110085189 | 7/2011 |
| KR | 10-20120058015 | 6/2012 |
| KR | 10-20120134453 | 12/2012 |

OTHER PUBLICATIONS

International Search Report and Written Opinion from International Patent Application Serial No. PCT/US2015/019129, dated Jun. 4, 2015, 12 pages.

* cited by examiner

*Primary Examiner* — William Tran
(74) *Attorney, Agent, or Firm* — Byrne Poh LLP

(57) ABSTRACT

This disclosure generally relates to systems and methods that facilitate transitioning a current playback of a video in a video application to a video widget when the video application is moved to a background of a multitasking operating system in which the video application is executing. The transition occurs seamlessly at a point of the current playback in the video application when the video application is moved to the background. Furthermore, upon the video application being moved to the foreground of the multitasking operating system, current playback of the video in the video widget is seamlessly transitioned to the video application.

23 Claims, 11 Drawing Sheets

SYSTEM AND METHOD FOR CONTINUING PLAYBACK IN WIDGET AFTER APP IS BACKGROUNDED

TECHNICAL FIELD

This disclosure generally relates to systems and methods that facilitate seamlessly transitioning a current playback of a video in a video application to a video widget when the video application is moved to a background of a multitasking operating system in which the video application is executing. The transition occurs seamlessly at a point of the current playback in the video application when the video application is moved to the background. Furthermore, upon the video application being moved to the foreground of the multitasking operating system, current playback of the video in the video widget is seamlessly transitioned to the video application.

BACKGROUND OF THE INVENTION

Mobile devices allow users to switch across varieties of applications installed on the device. However, when an application, such as a video application, that is currently in the foreground of the operating system of the mobile device (e.g., an application that the user has selected for current operation and/or interaction) is moved to the background of the operating system (e.g., an application that the user has navigated away from), the video application is stopped, paused, or closed. This is not an ideal user experience, for example, when the user may want to employ another application or check notifications, but let the backgrounded video application continue to play the video.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, a first input is detected that moves a video application from a foreground to a background of a multitasking operating system; and in response to the first input: a first current playback point of the video in the video application is determined, playback of the video at the first current playback point is initiated in a widget application, and the video application is moved to the background of the multitasking operating system.

In accordance with a non-limiting implementation, an application transfer component is configured to determine that a video application has been moved from a foreground to a background of an operating system of the device, determine a first current playback point of the video in the video application, and start playback of the video at the first current playback point in a video widget.

In accordance with a non-limiting implementation, it is detected that a video application has been moved from a foreground to a background of an operating system of the device, a first current playback point of the video in the video application is identified, and playback of the video at the first current playback point in a video widget is commenced.

These and other implementations and embodiments are described in more detail below.

DETAILED DESCRIPTION

Overview

Figure 1:
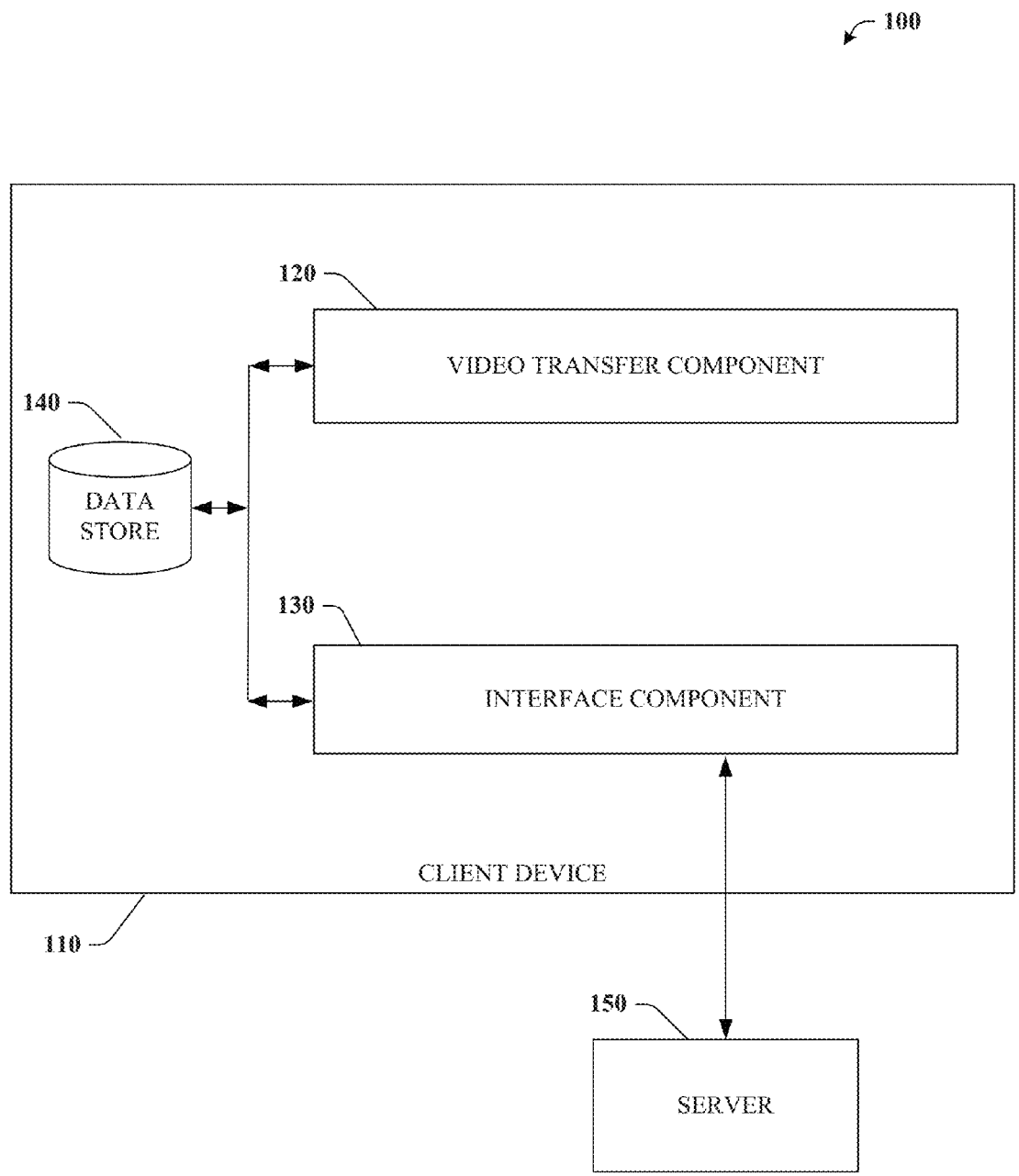
FIG. 1 illustrates a block diagram of an exemplary non-limiting example system for seamlessly transitioning a current playback of a video in a video application to a video widget when the video application is moved to a background of a multitasking operating system in which the video application is executing, and upon the video application being moved to the foreground of the multitasking operating system, seamlessly transitioning current playback of the video in the video widget to the video application in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In accordance with various disclosed aspects, a mechanism is provided for a client device (e.g., user device) to seamlessly transition (e.g., transfer, handoff, shift, switch, or move) a current playback of a video in a video application to a video widget (e.g., live widget, real-time widget, live tile, widget application, or live icon) when the video application is moved to a background of a multitasking operating system in which the video application is executing. Upon the video application being moved to the foreground of the multitasking operating system, a mechanism is provided to seamlessly transition current playback of the video in the video widget to the video application. It is to be appreciated that in a non-limiting example, a widget can be an application that comprises a subset of functionality of a corresponding full application. For example, the video widget can comprise a subset of the functionality of the video application. In another example, the video widget can be a completely different type of application from the video application (e.g., different form, different publisher, different codecs supported, different functionality, or any other suitable differentiating characteristic)

While embodiments presented herein use videos being transitioned between a video application and video widget for ease of explanation, it is to be appreciated that concepts herein are applicable to any suitable content for which continued play can be transitioned back and forth between an application and a corresponding widget, non-limiting examples of which can include, music, speeches, cartoons, short films, movies, televisions shows, games, applications, or any other suitable creative work.

Referring now to the drawings, FIG. 1 depicts a system 100 for seamlessly transitioning a current playback of a video in a video application to a video widget when the video application is moved to a background of a multitasking operating system in which the video application is executing; and upon the video application being moved to the foreground of the multitasking operating system, seamlessly transitioning current playback of the video in the video widget to the video application. System 100 includes client device 110 that includes video transfer component 120 that seamlessly transitions a current playback of a video between a video application and video widget. Client device 110 also includes interface component 130 that interacts with server(s) 150 to facilitate exchange of data. Additionally, client device 110 includes a data store 140 that can store content and data generated and/or received by client device 110, video transfer component 120, and interface component 130. Data store 140 can be stored on any suitable type of storage device, non-limiting examples of which are illustrated with reference to FIGS. 6 and 7.

Figure 7:
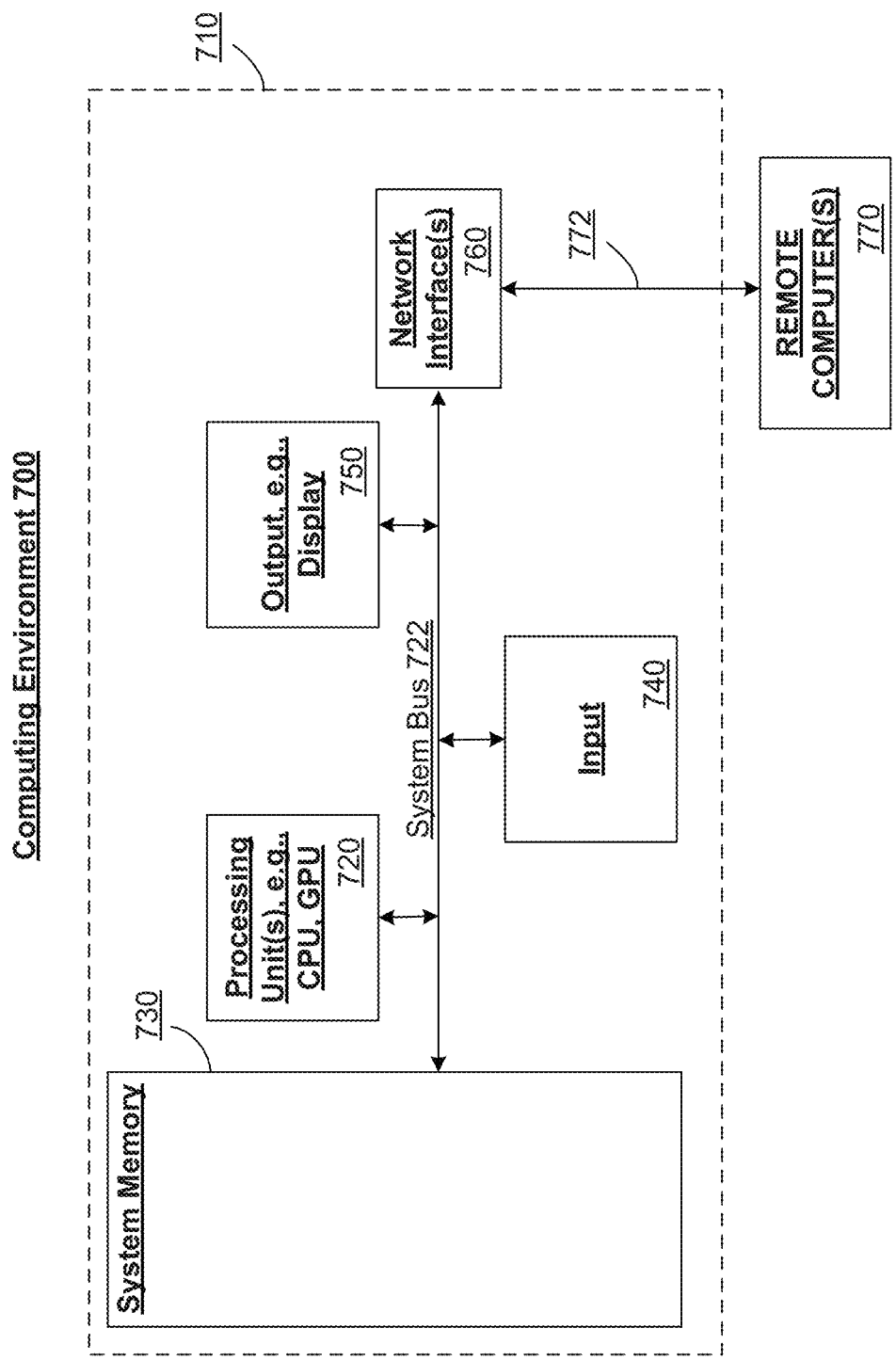
FIG. 7 illustrates a block diagram of an exemplary non-limiting computing system or operating environment in which various embodiments can be implemented.

Client device 110 and server 150 include at least one memory that stores computer executable components and at least one processor that executes the computer executable components stored in the memory, a non-limiting example of which can be found with reference to FIG. 7. Client device 110 can communicate via a wired and/or wireless network with server 150. Furthermore, Client device 110 can communicate with any suitable number of servers 150, and server 150 can communicate with any suitable number of client devices 110. It is further to be appreciated that server 150 can be another client device 110.

Client device 110 and server 150 can be any suitable type of device for recording, interacting with, receiving, accessing, or supplying data locally, or remotely over a wired or wireless communication link, non-limiting examples of which include a wearable device or a non-wearable device. Wearable device can include, for example, heads-up display glasses, a monocle, eyeglasses, contact lens, sunglasses, a headset, a visor, a cap, a helmet, a mask, a headband, clothing, camera, video camera, or any other suitable device capable of recording, interacting with, receiving, accessing, or supplying data that can be worn by a human or non-human user. Non-wearable device can include, for example, a mobile device, a mobile phone, a camera, a camcorder, a video camera, personal data assistant, laptop computer, tablet computer, desktop computer, server system, cable set top box, satellite set top box, cable modem, television set, monitor, media extender device, Blu-ray device, DVD (digital versatile disc or digital video disc) device, compact disc device, video game system, portable video game console, audio/video receiver, radio device, portable music player, navigation system, car stereo, sensor, or any other suitable device capable of recording, interacting with, receiving, accessing, or supplying data. Moreover, Client device 110 and server 150 can include a user interface (e.g., a web browser or application), that can receive and present displays and data generated locally or remotely.

Figure 2:
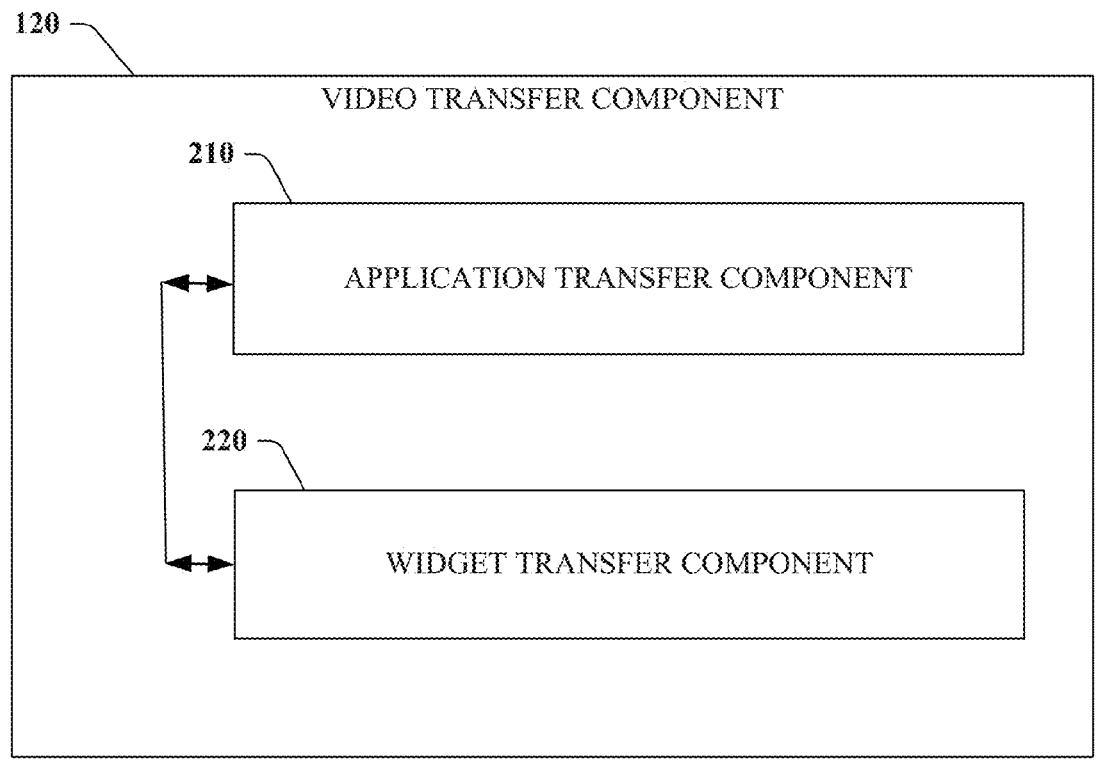
FIG. 2 illustrates a block diagram of an exemplary non-limiting video transfer component that seamlessly transitioning a current playback of a video between a video application and video widget in accordance with an implementation of this disclosure.

FIG. 2 illustrates video transfer component 120 that includes an application transfer component 210 that seamlessly transitions a current playback of a video in a video application to a video widget when the video application is moved to a background of a multitasking operating system in which the video application is executing. For example, a client device can be executing a multitasking operating system that allows a user to switch between tasks executing by the operating system. The user can be playing a video in a video application and receive a notification that an email has arrived. The user can select a home button on the client device that moves the video application to a background of the operating system and presents a home screen, such that they can select an application icon for an email application or view an email widget on the home screen. Upon the video application being moved to a background of the operating system, application transfer component 210 can seamlessly transition playback of the video to a video widget on the home screen at a current point in time of the playback in the video application when the user selected the home screen. The playback of the video will begin in the video widget at the current point in playback time to allow for a seamless transition. It is to be appreciated that application transfer component 210 can detect that video application has been moved to a background of a multitasking operating system, be informed by the multitasking operating system that video application has been moved to the background, or user any other suitable mechanism to determine that video application has been moved to the background of the multitasking operating system. It should be understood that the widget can also be executed by the multitasking operating system. Furthermore, the video can be locally stored on client device 110 or streamed from server 150.

Figure 3A:
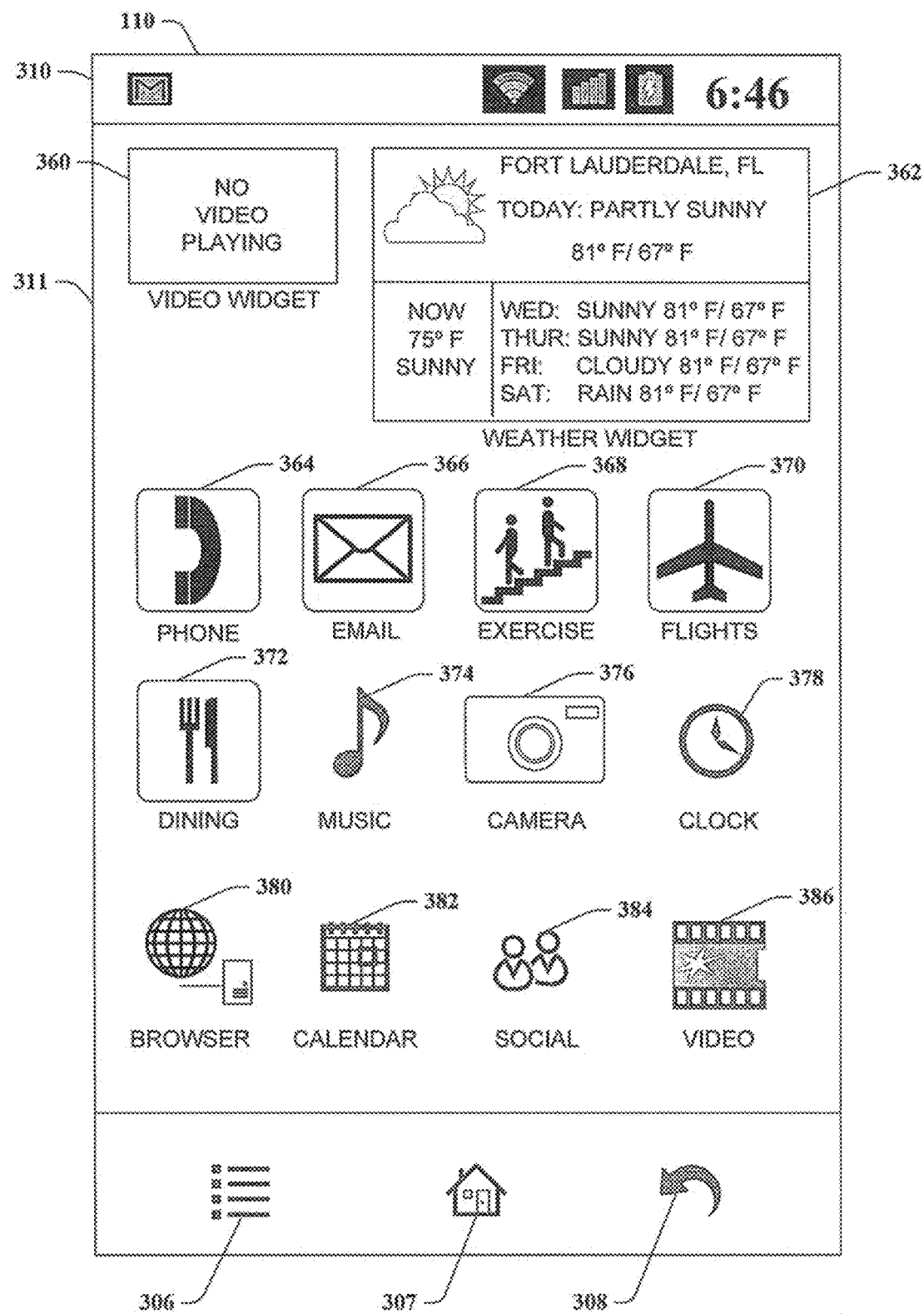
FIG. 3A illustrates a non-limiting example client device is illustrated in accordance with an implementation of this disclosure.

Referring to FIG. 3A, a non-limiting example client device 110 is illustrated. Client device 110 includes a notification area 310 that provides notifications to the user using graphics or text. Client device 110 includes a menu button 306 that upon selection displays a menu of options that the user can select. Client device 110 also includes a home button 307 that upon selection brings the display to a home screen. Client device 110 includes a return (e.g., go back) button 308 that upon selection brings the display to a previous activity, application, or display. Additionally, client device 110 can display a variety of widgets and application icons on a screen, such as in a non-limiting example, home screen 311. In this non-limiting example, client device 110 is depicted with a video widget 360, a weather widget 362, a phone application icon 364, an email application icon 366, an exercise application icon 368, a flight application icon 370, a dining application icon 373, a music application icon 374, a camera application icon 376, a clock widget 378, a browser application icon 380, a calendar application icon 382, a social networking application icon 384, and a video application icon 386. It is to be appreciated that any suitable buttons, notifications, applications, application icons, and/or widgets can be displayed by client device 110 in any suitable format or location. Video widget 360 is depicted in this example where there is no video playing in the widget. A user can interact with any button, notification, application, application icon, and/or widget displayed by client device 110. For example, a user can select video application icon 386 to bring the video application to the foreground of the multitasking operating system on client device 110.

Figure 3B:
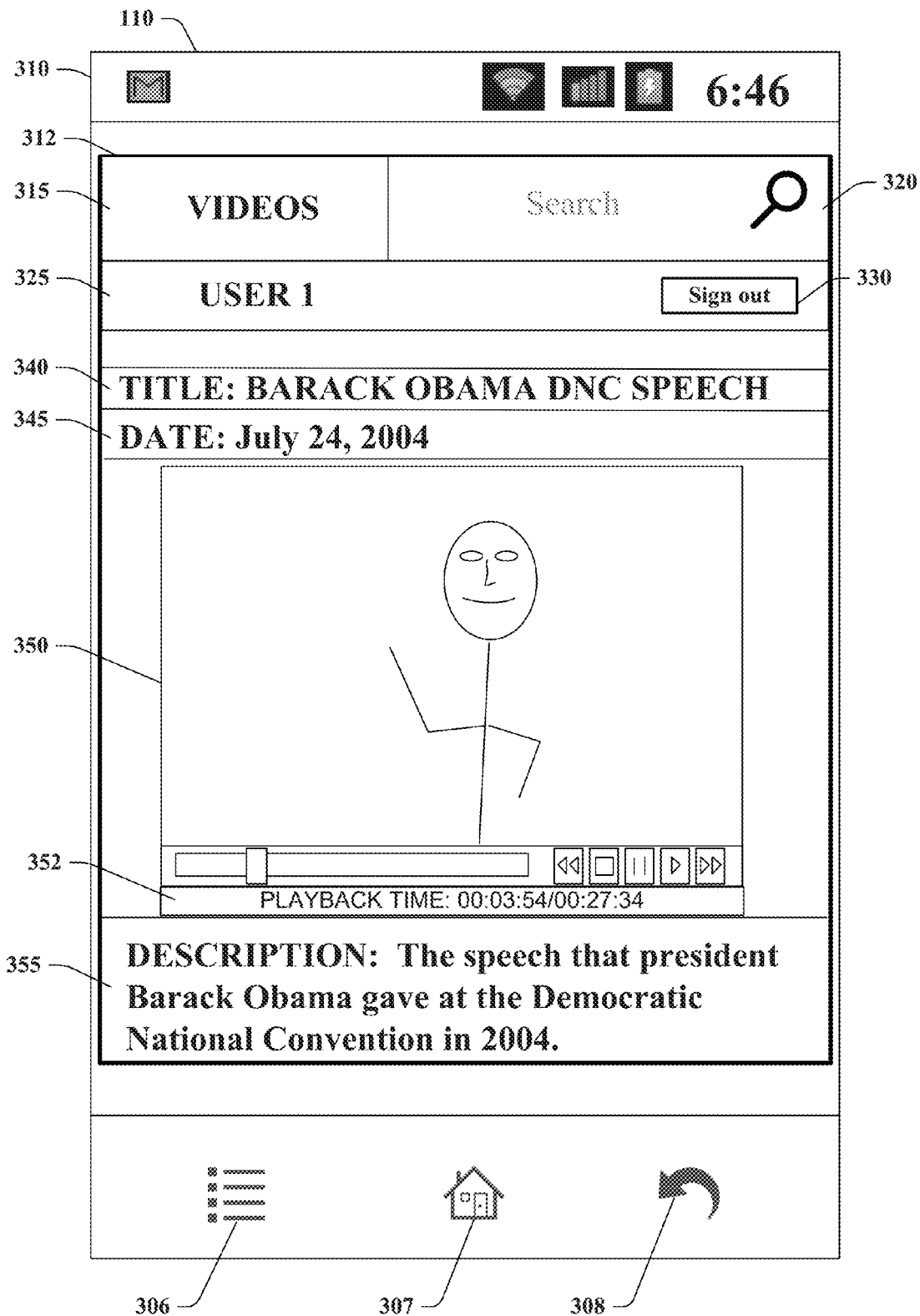
FIG. 3B illustrates a non-limiting example client device corresponding to FIG. 3A where a user has selected a video application icon in accordance with an implementation of this disclosure.

Referring to FIG. 3B, client device 110 is illustrated corresponding to FIG. 3A where a user has selected video application icon 386. Video application 312 corresponding to video application icon 386 is displayed by client device 110. Video application 312 includes a title area 315 that indicates the application or website that is currently active or in the foreground, which in this example is "VIDEOS". Video application 312 also includes a search area 320 that allows for entering a search query for content in the "VIDEOS". Furthermore, video application 312 includes a user area 325 that indicates the current user signed into the video application, which in this example is "USER 1", and that also provides a sign-out selection element 330 for the user to sign out of the application. In this example USER1 has selected a video "BARACK OBAMA DNC SPEECH" 350 for playback and title 340 "BARACK OBAMA DNC SPEECH", date 345 "Jul. 24, 2004", and description 355 "The speech that president Barack Obama gave at the Democratic National Convention in 2004" are displayed. It is to be appreciated that any suitable details associated with the video can be presented. In this example, playback time area 352 indicates that the current playback time of video 350 is at 00:03:54 out of 00:27:34 total time for video 350.

Video application 312 can be moved to the background of the multitasking operating system on client device 110 by user action or operating system action. For example, a user can select home button 307 to move video application 312 to the background and display the home screen 311. In another example, a notification can pop-up informing the user of an email that has arrived, and the user can select the notification to move video application 312 to the background and display an email application (not shown). In a further example, the multitasking operating system on client device 110 can automatically move video application 312 to the background and display another screen or application, such as based upon system defined or user defined settings and/or preferences. It is to be appreciated that any suitable mechanism can be employed to move video application 312 to the background or foreground of the multitasking operating system on client device 110.

Referring back to FIG. 2, upon video application 312 being moved to the background of the multitasking operating system on client device 110, application transfer component 210 can execute a seamless transition of playback of a video currently playing in video application 312 to video widget 360. In a non-limiting example, video application 312 informs video widget 360 of the current playback time of the video in video application 312. In another example, application transfer component 210 monitors playback of video in video application 312 and informs video widget 360 of the current playback time of the video in video application 312. In an additional example, video widget 360 monitors current playback time of the video in video application 312. In a further example, video processing (e.g., decoding) occurring in a processing thread associated with playback of the video is maintained and a separate process for rendering of a graphical display associated with the video processing is moved from the video application to the video widget. In this manner, communication of a current playback time of the video in video application 312 to video widget 360 is not required. In an additional example, video application 312 and video widget 360 can employ differing decoding or rendering processes or codecs. Furthermore, video application 312 and video widget 360 can access different versions of video 350 for display. Video application 312, application transfer component 210, or video widget 360 can initiate video widget 360 to begin playback of the video at the current playback point from video application 312. It is to be appreciated that any suitable mechanism for transitioning playback of the video at a current playback time of the video in video application 312 to video widget 360 can be employed. Furthermore, transitioning of playback of a video from a video application 312 to a video widget 360 or vice versa can be performed automatically based upon system defined or user specified setting or preference, or based upon a response to a prompt presented to a user when video application 312 is move between foreground and background inquiring whether transition should occur. Moreover, application transfer component 210 can determine or infer context of the user or client device to make decisions regarding allowing or blocking transitioning of playback of video 350 from video application 312 to widget 360. For example, system or user specified settings or preferences can specify that in response to notifications, emails, or phone calls of a particular priority level or higher will cause application transfer component 210 to block the transitioning a playback of video 350 from video application 312 to widget 360 when video application 312 is moved to the background. In another example, application transfer component 210 can determine that a user is at work and block the transitioning a playback of video 350 from video application 312 to widget 360 when video application 312 is moved to the background. In a further example, application transfer component 210 can determine user interest in video 350 by monitoring the user's eye gaze and upon video application 312 being automatically moved the background due to arrival of an email above an particular importance level, allow transitioning of playback of video 350 from video application 312 to widget 360 if the user's interest meets a particular interest level or block transitioning of playback of video 350 from video application 312 to widget 360 if the user's interest does not meet a particular interest level. It is to be appreciated that any suitable context parameter or threshold can be employed by application transfer component 210 in determining whether to allow or block transitioning of playback of video 350 from video application 312 to widget 360.

Figure 3C:
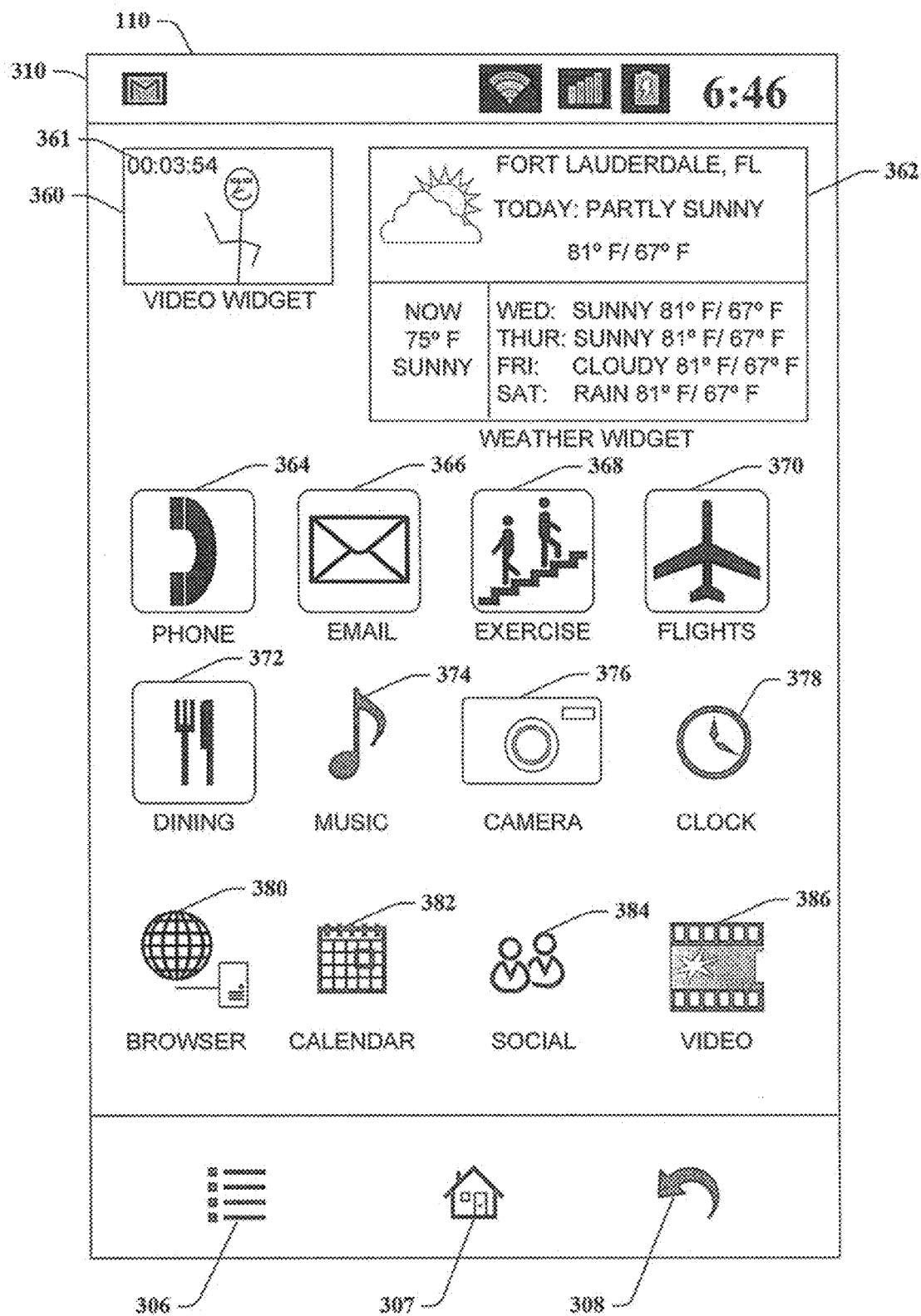
FIG. 3C illustrates a non-limiting example client device corresponding to FIG. 3B where video application has been moved to the background and playback of the video has been seamless transitioned to video widget at the current playback time in video application in accordance with an implementation of this disclosure.

Referring to FIG. 3C, is depicted client device 110 corresponding to FIG. 3B where video application 312 has been moved to the background and playback of the video 350 has been seamlessly transitioned to video widget 360 at the current playback time of 00:03:54 in video application 312. It is to be appreciated that video widget 360 can have controls for the user to control playback of the video (not shown). Furthermore, while this example depicts video widget 360 as residing on the home screen, video widget 360 can reside on any screen on client device 110. Moreover, in another video widget 360 does not reside on any screen on client device 110, and can be displayed as needed, such as a floating widget (e.g., a widget that pop-ups as required or specified, and floats above other portions of the display, a floating widget is not shown herein). A user can interact with any button, notification, widget, application icon, or application on client device 110 while video widget 360 plays video 350. It is also to be appreciated that video 350 can also continue playback in video application 312 in sync with video widget 360, or can be stopped in video application 312, for example, based upon system defined or user specified settings or preference. Furthermore, while examples herein disclose seamlessly transitioning playback between video application and video widget at a current playback time, it is to be appreciated that in another example, transitioning can occur at a playback time prior to or after the current playback time, such by a system defined or user specified setting or preference.

Referring back to FIG. 2, video transfer component 120 also includes widget transfer component 220 that seamlessly transitions a current playback of a video in a video widget 360 to a video application 312 when the video application is moved to a foreground of a multitasking operating system in which the video application is executing. For example, a user can select a video application icon 386 or employ an application manager (not shown) on the client device that moves the video application to a foreground of the operating system. Upon the video application 312 being moved to a foreground of the operating system, widget transfer component 220 can seamlessly transition playback of the video to the video application 312 at a current point in time of the playback in the video widget 360 when the video application moved to the foreground. The playback of the video will begin in the video application 312 at the current point in playback time to allow for a seamless transition. It is to be appreciated that widget transfer component 220 can detect that video application has been moved to a foreground of a multitasking operating system, be informed by the multitasking operating system that video application has been moved to the foreground, or employ any other suitable mechanism to determine that video application has been moved to the foreground of a multitasking operating system.

Figure 3D:
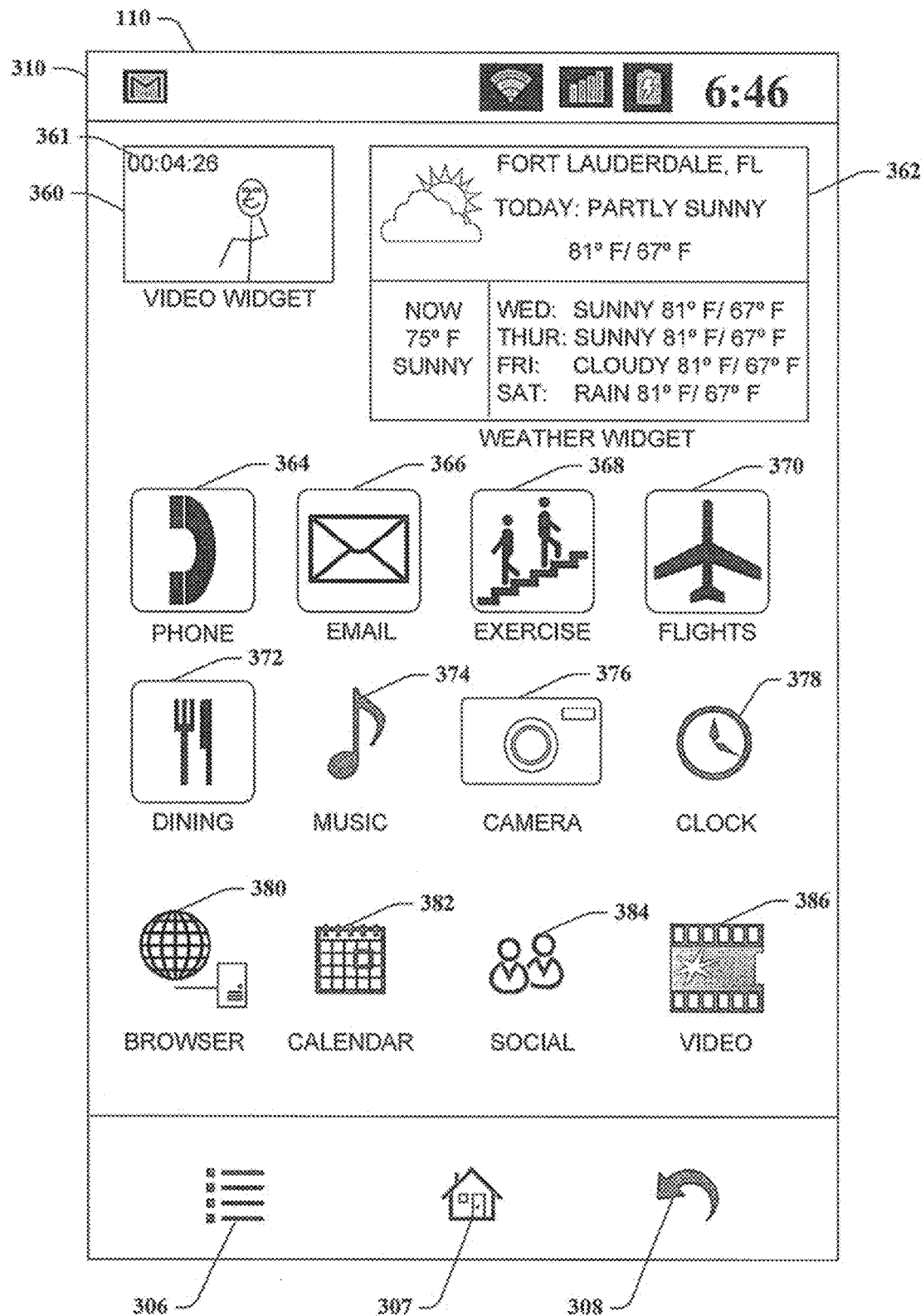
FIG. 3D illustrates a non-limiting example client device corresponding to FIG. 3C where video widget has continued playback of video in accordance with an implementation of this disclosure.

FIG. 3D depicts client device 110 corresponding to FIG. 3C where video widget 360 has continued playback of video 350 to a current playback time of 00:04:26.

Referring back to FIG. 2, upon video application 312 being moved to the foreground of the multitasking operating system on client device 110, widget transfer component 220 execute a seamless transition of playback of a video currently playing in video widget 360 to video application 312. In a non-limiting example, video widget 360 informs video application 312 of the current playback time of the video in video widget 360. In another example, application transfer component 210 monitors playback of video in video widget 360 and informs video application 312 of the current playback time of the video in video widget 360. In an additional example, video application 312 monitors current playback time of the video in video widget 360. In a further example, video processing (e.g., decoding) occurring in a processing thread associated with playback of the video is maintained, and a separate process for rendering of a graphical display associated with the video processing is moved from the video widget 360 to video application 312. In this manner, communication of a current playback time of the video in video widget 360 to video application 312 is not required. Video application 312, application transfer component 210, or video widget 360 can initiate video application 312 to being playback of the video at the current playback point of the video from video widget 360. It is to be appreciated that any suitable mechanism for transitioning playback of the video at a current playback time of the video in video widget 360 to video application 312 can be employed. It is also to be appreciated that video 350 can also continue playback in video widget 360 in sync with video application 312, or can be stopped in video widget 360, for example, based upon system defined or user specified settings or preference.

Figure 3E:
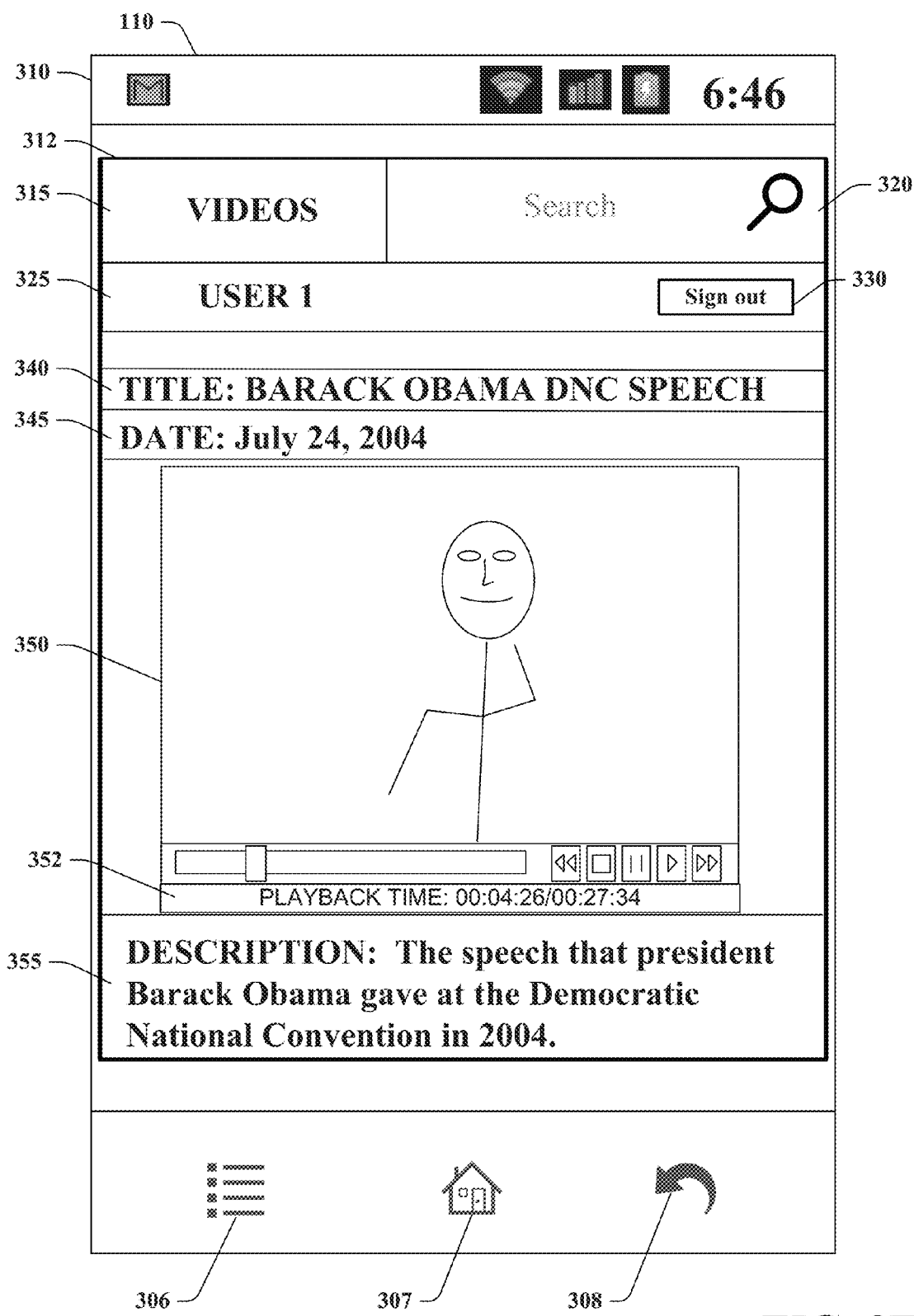
FIG. 3E illustrates a non-limiting example client device corresponding to FIG. 3D where video application has been moved to the foreground and playback of the video has been seamless transitioned to video application at the current playback time in video widget in accordance with an implementation of this disclosure.

Referring to FIG. 3E, client device 110 is illustrated corresponding to FIG. 3D, where a user has selected video application icon 386. As such, video application 312 corresponding to video application icon 386 is moved to the foreground of the multitasking operating system and displayed by client device 110. Widget transfer component 220 executes a seamless transition of playback of video 350 from the current playback time of 00:04:26 from video widget 360 to video application 312.

It is to be appreciated that while the example herein discloses a video widget 360 playing a video that was transitioned from a video application 312 and then transitioned back to the video application 312, a user can initiate playback of a video in video widget 360 and upon a video application 312 being initiated or moved to the foreground, a current playback of the video in video widget 360 can be transitioned from video widget 360 to video application 312.

Figure 4:
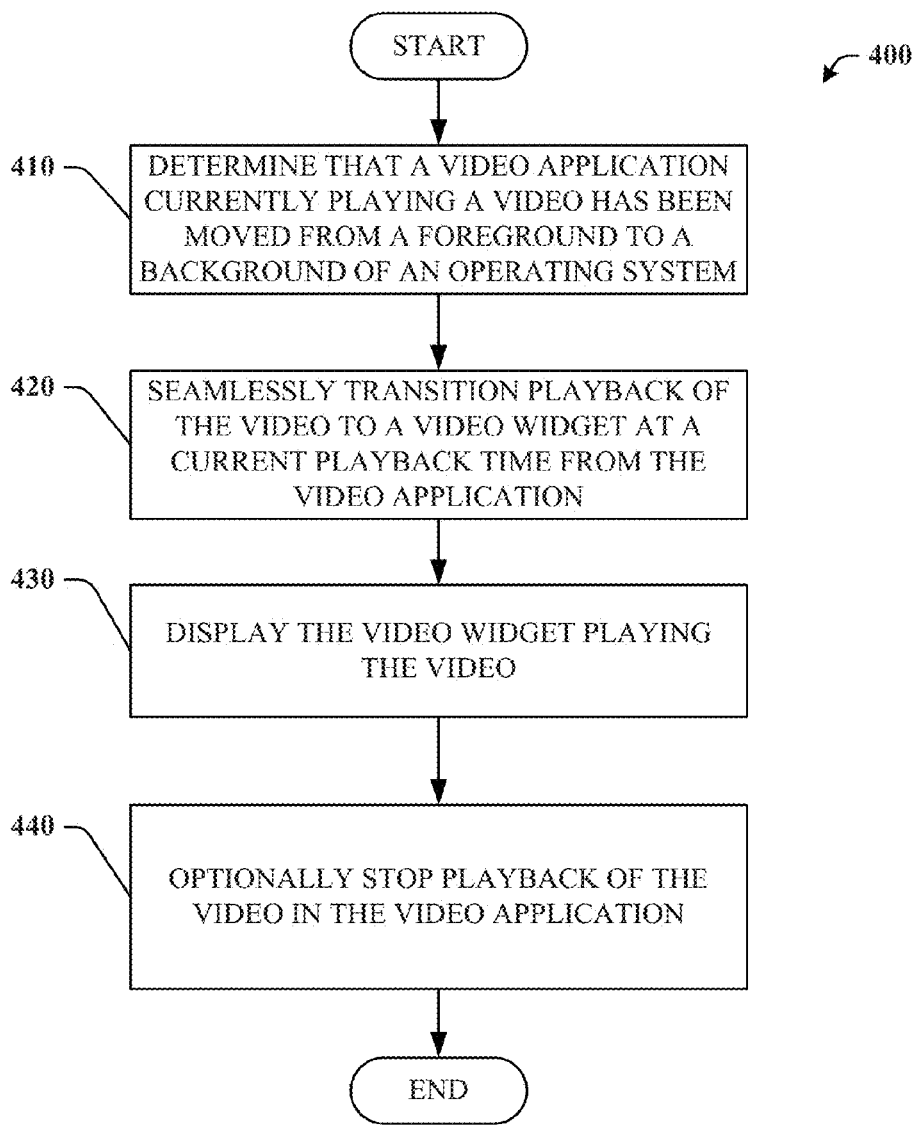
FIG. 4 illustrates an exemplary non-limiting flow diagram for seamlessly transitioning a current playback of a video in a video application to a video widget when the video application is moved to a background of a multitasking operating system in which the video application is executing in accordance with an implementation of this disclosure.
Figure 5:
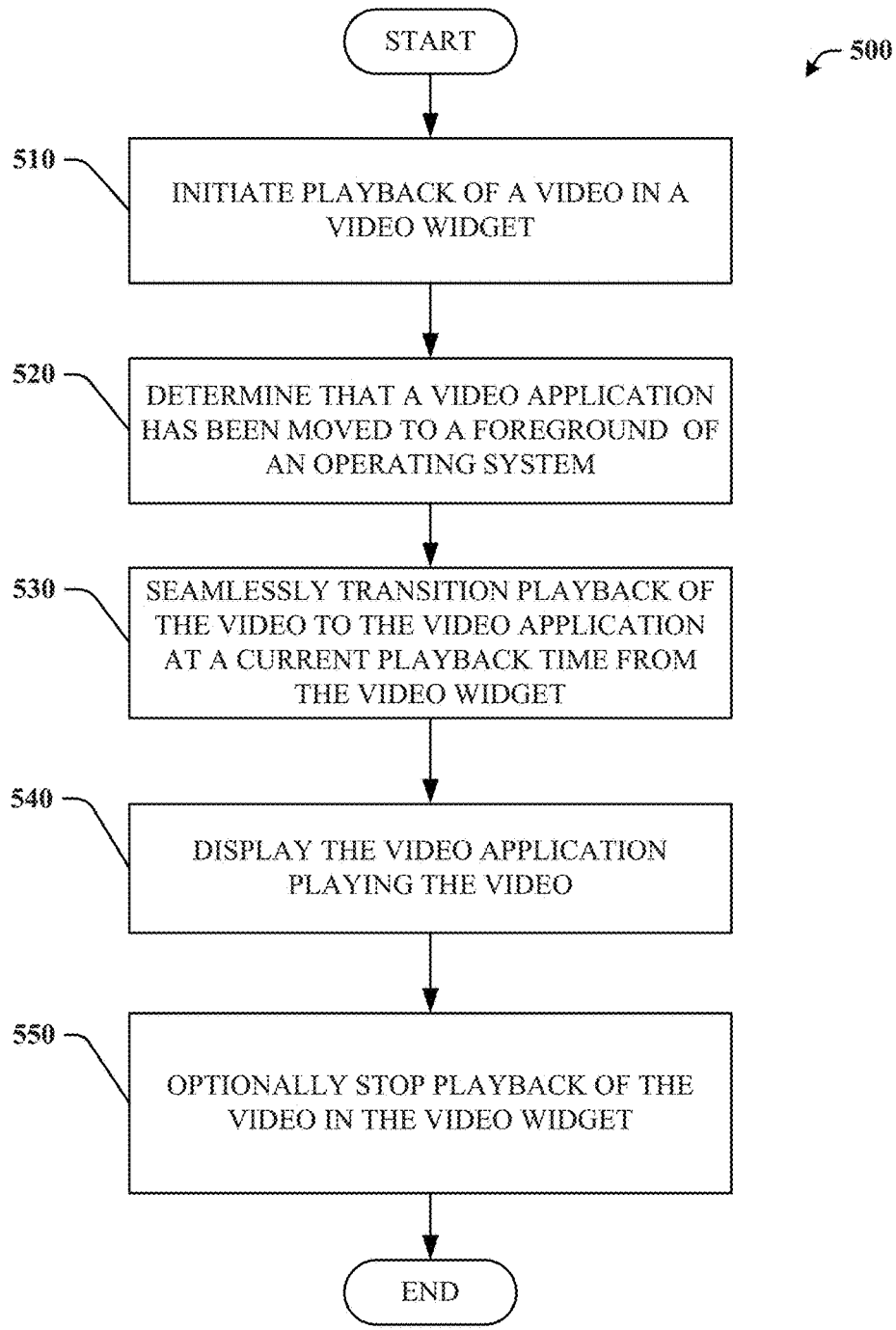
FIG. 5 illustrates an exemplary non-limiting flow diagram for seamlessly transitioning a current playback of a video in a video widget to a video application when the video application is moved to a foreground of a multitasking operating system in which the video application is executing in accordance with an implementation of this disclosure.

FIGS. 4 and 5 illustrate various methods in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

FIG. 4 depicts an exemplary method 400 (e.g., by an application transfer component 210, a video transfer component 120, or client device 110) for seamlessly transitioning a current playback of a video in a video application to a video widget when the video application is moved to a background of a multitasking operating system in which the video application is executing. At reference numeral 410, it is determined that a video application currently playing a video has been moved from a foreground to a background of an operating system. At reference numeral 420, playback of the video is seamlessly transitioned from the video application to a video widget at a current playback time from the video application. At reference numeral 430, the video widget playing the video is displayed. At reference numeral 440, optionally playback of the video is stopped in the video application.

FIG. 5 depicts an exemplary method 500 (e.g., by a widget transfer component 220, video transfer component 120, or client device 110) for seamlessly transitioning a current playback of a video in a video widget to a video application when the video application is moved to a foreground of a multitasking operating system in which the video application is executing. At reference numeral 510, playback of a video is initiated in a video widget. At reference numeral 520, it is determined that a video application has been initiated or moved from a background to a foreground of an operating system. At reference numeral 530, playback of the video is seamlessly transitioned from the video widget to the video application at a current playback time from the video widget. At reference numeral 540, the video application playing the video is displayed. At reference numeral 550, optionally playback of the video is stopped in the video widget.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 6:
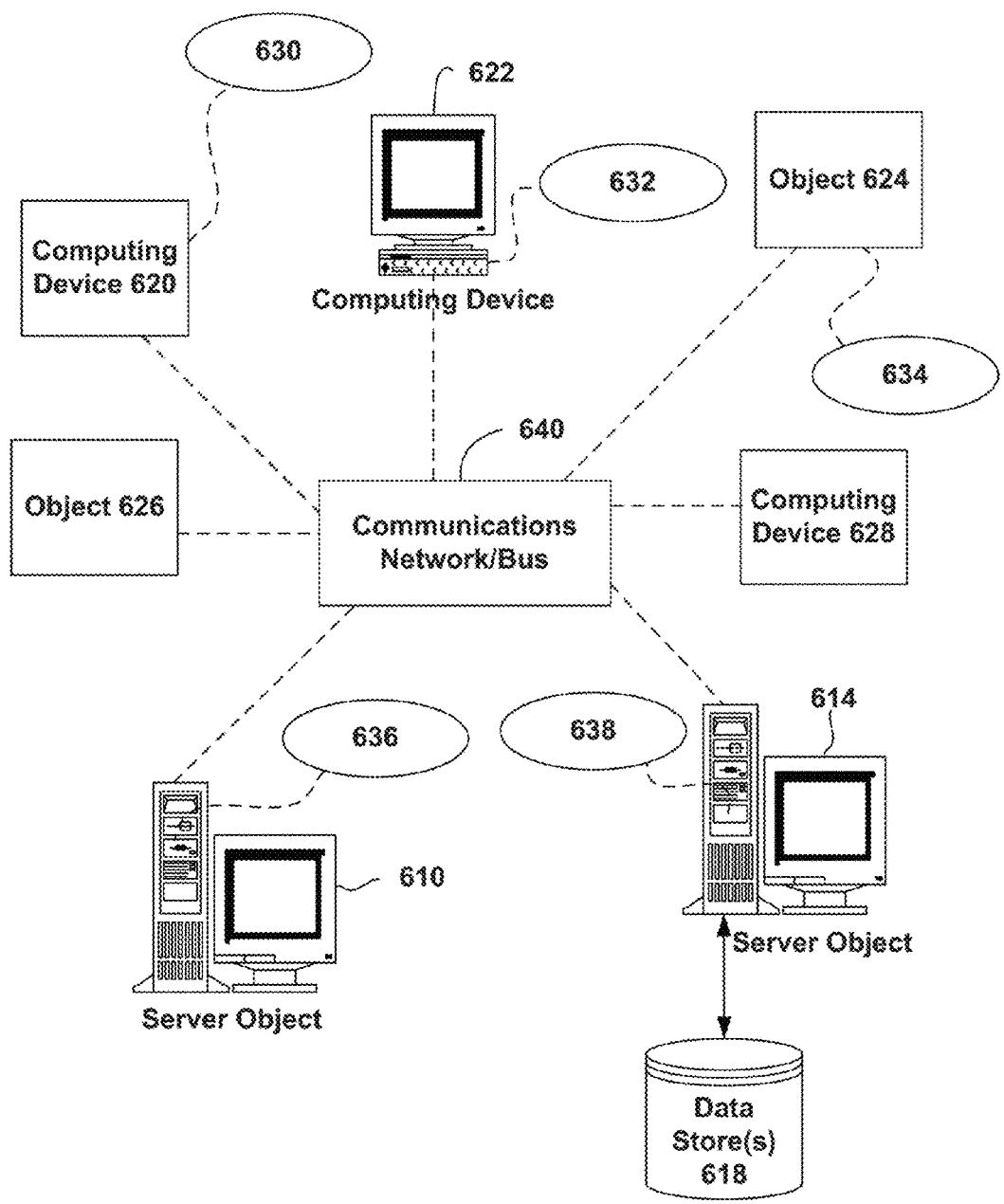
FIG. 6 illustrates a block diagram of an exemplary non-limiting networked environment in which various embodiments can be implemented.

FIG. 6 provides a schematic diagram of an exemplary networked or distributed computing environment. The distributed computing environment comprises computing objects 610, 612, etc. and computing objects or devices 618, 620, 622, 624, 626, 628, etc., which may include programs, methods, data stores, programmable logic, etc., as represented by applications 630, 632, 634, 636, 638. It can be appreciated that computing objects 610, 612, etc. and computing objects or devices 618, 620, 622, 624, 626, 628, etc. may comprise different devices, such as personal digital assistants (PDAs), audio/video devices, mobile phones, MP3 players, personal computers, laptops, tablets, etc.

Each computing object 610, 612, etc. and computing objects or devices 618, 620, 622, 624, 626, 628, etc. can communicate with one or more other computing objects 610, 612, etc. and computing objects or devices 618, 620, 622, 624, 626, 628, etc. by way of the communications network 640, either directly or indirectly. Even though illustrated as a single element in FIG. 6, network 640 may comprise other computing objects and computing devices that provide services to the system of FIG. 6, and/or may represent multiple interconnected networks, which are not shown. Each computing object 610, 612, etc. or computing objects or devices 618, 620, 622, 624, 626, 628, etc. can also contain an application, such as applications 630, 632, 634, 636, 638, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 6, as a non-limiting example, computing objects or devices 618, 620, 622, 624, 626, 628, etc. can be thought of as clients and computing objects 610, 612, etc. can be thought of as servers where computing objects 610, 612, etc. provide data services, such as receiving data from client computing objects or devices 618, 620, 622, 624, 626, 628, etc., storing of data, processing of data, transmitting data to client computing objects or devices 618, 620, 622, 624, 626, 628, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 640 is the Internet, for example, the computing objects 610, 612, etc. can be Web servers, file servers, media servers, etc. with which the client computing objects or devices 618, 620, 622, 624, 626, 628, etc. communicate via any of a number of known protocols, such as the hypertext transfer protocol (HTTP). Objects 610, 612, etc. may also serve as client computing objects or devices 618, 620, 622, 624, 626, 628, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the computer described below in FIG. 7 is but one example of a computing device that can be employed with implementing one or more of the systems or methods shown and described in connection with FIGS. 1-5. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. Neither is the computing environment 700 be interpreted as having any dependency or requirement relating to any one or combination of components illustrated in the exemplary operating environment 700.

With reference to FIG. 7, an exemplary computing device for implementing one or more embodiments in the form of a computer 710 is depicted. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 710. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770 via network interface 760. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring relationships between metadata or inferring topics of interest to users), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $z=(z1, z2, z3, z4, zn)$, to a confidence that the input belongs to a class, as by $f(z)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method, comprising:

causing, by a device including a hardware processor, a video to be played back in a video application, wherein the video application is presented in a foreground of a multitasking operating system of the device;

while the video is played back in the video application being presented in the foreground of the multitasking operating system of the device, detecting, by the device, a first input that moves the video application from the foreground to a background of the multitasking operating system of the device;

in response to detecting the first input, causing, by the device, the video application to be moved to the background and determining a first current playback point of the video in the video application;

in response to moving the video application to the background of the multitasking operating system of the device, causing a video widget application to be presented on an interface of the multitasking operating system of the device; and causing, by the device, the video to continue being played back at the first current playback point within the video widget application being presented on the interface of the multitasking operating system of the device.

2. The method of claim 1, wherein the video widget application is persistent on a display of the device.

3. The method of claim 1, wherein the video widget application is a floating widget and the continued playback of the video at the first current playback point in the video widget application comprises activating the floating widget.

4. The method of claim 1, wherein the determining the first current playback point of the video comprises receiving data from the video application indicating the first current playback point.

5. The method of claim 1, wherein the determining the first current playback point of the video comprises tracking current playback of the video in the video application.

6. The method of claim 1, wherein the moving the video application to the background of the multitasking operating system comprises stopping playback of the video in the video application.

7. The method of claim 1, further comprising:
receiving, by the device, a second input that moves the video application into a foreground of the multitasking operating system; and in response to the second input:
determining, by the device, a second current playback point of the video in the video widget application;
moving, by the device, the video application to the foreground of the multitasking operating system;
causing, by the device, of the video to continue being played back at the second current playback point in the video application; and
stopping, by the device, the playback of the video in the video widget application.

8. The method of claim 7, wherein the determining the second current playback point of the video comprises receiving data from the video widget application indicating the second current playback point.

9. The method of claim 7, wherein the determining the second current playback point of the video comprises tracking current playback of the video in the video widget application.

10. The method of claim 7, wherein initiating playback of the video at the second current playback point comprises:
presenting an element inquiring whether to continue playback of the video in the video application;

in response to receiving third input indicating to continue playback of the video, continuing playback of the video at the second current playback point in the video application; and in response to receiving third input indicating not to continue playback of the video, not continuing playback of the video in the video application.

11. A system, comprising:
at least one processor that executes computer executable instructions stored in memory that cause the at least one processor to:
cause a video to be played back in a video application, wherein the video application is presented in a foreground of a multitasking operating system of a device including the at least one processor;
while the video is played back in the video application being presented in the foreground of the multitasking operating system of the device, detect a first input that moves the video application from the foreground to the background of the multitasking operating system of the device;
cause the video application be moved to the background and determine a first current playback point of the video in the video application in response to detecting the first input;
in response to moving the video application to the background of the multitasking operating system of the device, cause a video widget application to be presented on an interface of the multitasking operating system of the device; and
cause the video to continue being played back at the first current playback point within the video widget application being presented on the interface of the multitasking operating system of the device.

12. The system of claim 11, wherein the at least one processor is further configured to receive first data from the video application indicating the first current playback point.

13. The system of claim 11, wherein the at least one processor is further configured to track current playback of the video in the video application in order to determine the first current playback point.

14. The system of claim 11, wherein the at least one processor is further configured to:
determine that the video application has been moved from the background to the foreground of the operating system;
determine a second current playback point of the video in the video widget application; and
cause the video to continue being played back at the second current playback point in the video application.

15. The system of claim 14, wherein the at least one processor is further configured to receive second data from the video widget application indicating the second current playback point.

16. The system of claim 14, wherein the at least one processor is further configured to track current playback of the video in the video widget application in order to determine the second current playback point.

17. A non-transitory computer-readable medium having instructions stored thereon that, in response to execution, cause a device including a processor to perform operations comprising:
causing a video to be played back in a video application, wherein the video application is presented in a foreground of a multitasking operating system of the device;

while the video is played back in the video application being presented in the foreground of the multitasking operating system of the device, detecting the video application from the foreground to a background of the multitasking operating system of the device;

causing the video application to be moved to the background and detecting a first current playback point of the video in the video application in response to detecting the first input;

in response to moving the video application to the background of the multitasking operating system of the device, causing a video widget application to be presented on an interface of the multitasking operating system of the device; and causing the video to continue being played back at the first current playback point within the video widget application being presented on the interface of the multitasking operating system of the device.

18. The non-transitory computer-readable medium of claim 17, wherein the identifying the first current playback point of the video in the video application comprises receiving first data from the video application indicating the first current playback point.

19. The non-transitory computer-readable medium of claim 17, wherein the identifying the first current playback point of the video in the video application comprises tracking current playback of the video in the video application.

20. The non-transitory computer-readable medium of claim 17, further comprising:

detecting that the video application has been moved from the background to the foreground of the operating system;

identifying a second current playback point of the video in the video widget application; and causing the video to continue being played back at the second current playback point in the video application.

21. The non-transitory computer-readable medium of claim 20, wherein the identifying the second current playback point of the video in the video widget application comprises receive second data from the video widget application indicating the second current playback point.

22. The non-transitory computer-readable medium of claim 20, wherein the identifying the second current playback point of the video in the video widget application comprises tracking current playback of the video in the video widget application in order to determine the second current playback point.

23. The non-transitory computer-readable medium of claim 20, wherein the commencing playback of the video at the first current playback point in a video widget application is selectively executed based upon a context of the device.

* * * * *